(12) United States Patent
Wang

(10) Patent No.: US 12,190,662 B2
(45) Date of Patent: Jan. 7, 2025

(54) ANCHOR POINT ASSEMBLY, AND VEHICLE ENTRY SYSTEM

(71) Applicants: Inventec (Pudong) Technology Corporation, Shanghai (CN); INVENTEC CORPORATION, Taipei (TW)

(72) Inventor: Zhien Wang, Shanghai (CN)

(73) Assignees: Inventec (Pudong) Technology Corporation, Shanghai (CN); INVENTEC CORPORATION, Taipei (TW)

( * ) Notice: Subject to any disclaimer, the term of this patent is extended or adjusted under 35 U.S.C. 154(b) by 309 days.

(21) Appl. No.: 17/846,049

(22) Filed: Jun. 22, 2022

(65) Prior Publication Data
US 2023/0274593 A1 Aug. 31, 2023

(30) Foreign Application Priority Data
Feb. 25, 2022 (CN) .......................... 202210179535.4

(51) Int. Cl.
*G07C 9/00* (2020.01)
*H04L 12/40* (2006.01)

(52) U.S. Cl.
CPC .......... *G07C 9/00309* (2013.01); *H04L 12/40* (2013.01); *G07C 2009/00317* (2013.01); *G07C 2009/00365* (2013.01); *H04L 2012/40215* (2013.01)

(58) Field of Classification Search
CPC ...... G07C 9/00309; G07C 2009/00317; G07C 2009/00365
See application file for complete search history.

(56) References Cited

U.S. PATENT DOCUMENTS

| 2021/0139001 A1* | 5/2021 | Knutson | B60R 25/2081 |
| 2023/0058744 A1* | 2/2023 | Lim | H04W 4/023 |

FOREIGN PATENT DOCUMENTS

| CN | 113900430 A * | 1/2022 | G05B 23/0213 |

* cited by examiner

*Primary Examiner* — Nabil H Syed
(74) *Attorney, Agent, or Firm* — IPRTOP LLC

(57) ABSTRACT

An anchor point assembly, a vehicle entry system and a vehicle are provided. The anchor point assembly includes a control module, a power management module and a positioning module. The control module is connected to a vehicle end module, and is used to obtain position information of the vehicle end module according to a position identification signal of the vehicle end module. The power management module is connected to the control module and is used to supply electric power to the control module in conjunction with a power supply of a vehicle; the positioning module is connected to the control module, and is used to obtain position information of a control terminal and transmit the position information of the control terminal to the control module.

11 Claims, 3 Drawing Sheets

ANCHOR POINT ASSEMBLY, AND VEHICLE ENTRY SYSTEM

CROSS REFERENCE TO RELATED APPLICATION

This application claims the benefits of priority to Chinese Patent Application No. CN 2022101795354, entitled "Anchor Point Assembly, Vehicle Entry System and Vehicle", filed with CNIPA on Feb. 25, 2022, the content of which is incorporated herein by reference in its entirety.

FIELD OF TECHNOLOGY

The present disclosure relates to the field of vehicle accessories, and more specifically, to an anchor point assembly, and a vehicle entry system controller.

BACKGROUND

In recent years, with the development of technology and the increase of user demand, more and more vehicles are equipped with intelligent vehicle entry systems. Typically, a vehicle equipped with an intelligent entry system includes a master controller and multiple anchor point assemblies, the greater the number of anchor point assemblies, the more accurate the positioning of the control terminal. Taking a controller including four anchor point assemblies as an example, each of the four anchor point assemblies need to be configured with its own corresponding firmware package, and each of the four firmware packages need to be burned into the controller. On one hand, this will increase the workload of firmware development and maintenance; on the other hand, there is a problem of mismatch between the firmware packages and the anchor point assemblies due to reasons like misoperations in practical application, which leads to an increase in the rework rate.

SUMMARY

The present disclosure provides an anchor point assembly for a vehicle entry system. The anchor point assembly includes a control module, connected to a vehicle end module, used to obtain position information of the vehicle end module according to a position identification signal of the vehicle end module; a power management module, connected to the control module, used to supply electric power to the control module in conjunction with a power supply of a vehicle; and a positioning module, connected to the control module, used to obtain position information of a control terminal and to transmit the position information of the control terminal to the control module.

In an embodiment of the present disclosure, the positioning module includes: a Bluetooth positioning unit, used to obtain first position information of the control terminal; and an ultra-wideband positioning unit, used to obtain second position information of the control terminal.

In an embodiment of the present disclosure, the control module includes: a control chip; and a chip peripheral circuit, wherein the chip peripheral circuit is connected between the control chip and the vehicle end module.

In an embodiment of the present disclosure, the vehicle end module comprises at least one pull-up and pull-down circuit, the chip peripheral circuit comprises at least one connection branch, and each connection branch is connected to a corresponding pull-up and pull-down circuit and a pin of the control chip respectively.

In an embodiment of the present disclosure, each connection branch comprises a current limiting subcircuit and/or a filter subcircuit.

In an embodiment of the present disclosure, the current limiting subcircuit comprises a first resistor, a second resistor, a third resistor, and a diode, wherein a first end of the first resistor is connected to an output end of a corresponding pull-up and pull-down circuit and a cathode of the diode, and a second end of the first resistor is connected to an anode of the diode and a corresponding pin of the control chip; the second resistor is connected between a high voltage and the anode of the diode; the third resistor is connected between the anode of the diode and ground.

In an embodiment of the present disclosure, the filter subcircuit comprises at least one filter capacitor.

In an embodiment of the present disclosure, the anchor point assembly obtains a firmware package via the vehicle's CAN bus.

The present disclosure provides a vehicle entry system. The vehicle entry system includes a master controller; and at least two anchor point assemblies, the anchor point assemblies are disposed at different positions in a vehicle and are communicated with the master controller, and a firmware package is burned into each anchor point assembly.

In an embodiment of the present disclosure, the firmware package is stored in the master controller, and the master controller is used to transmit the firmware package to the vehicle end modules through CAN bus, so that the firmware package is burned into the anchor point assemblies.

In an embodiment of the present disclosure, each anchor point assembly includes a control module, and each control module is coupled to a corresponding vehicle end module, obtains position information of the corresponding vehicle end module according to a position identification signal of the corresponding vehicle end module, and selects a corresponding program from the firmware package for execution according to the position information of the corresponding vehicle end module.

In an embodiment of the present disclosure, the control module includes a control chip and a chip peripheral circuit; the chip peripheral circuit is coupled to the corresponding vehicle end module, and is used to process and transmit the position identification signal; the control chip is coupled to the chip peripheral circuit, and is used to determine the position information of the corresponding vehicle end module according to the position identification signal.

In an embodiment of the present disclosure, each vehicle end module includes a first pull-up and pull-down circuit, and a second pull-up and pull-down circuit, an output end of the first pull-up and pull-down circuit is coupled to a corresponding chip peripheral circuit, and the first pull-up and pull-down circuit is used to generates a first voltage value indicating the position identification signal; an output end of the second pull-up and pull-down circuit is coupled to the corresponding chip peripheral circuit, the second pull-up and pull-down circuit is used to generate a second voltage value indicating the position identification signal; a first pin of a corresponding control chip receives the first voltage value, a second pin of the corresponding control chip receives the second voltage value, the corresponding control chip determines the position information of the corresponding vehicle end module according to the first voltage value and the second voltage value.

In an embodiment of the present disclosure, the first pull-up and pull-down circuit includes a first pull-up resistor and a first pull-down resistor, the first pull-up resistor is connected to the first pull-down resistor, a connection node of the first pull-up resistor and the first pull-down resistor is used as the output end of the first pull-up and pull-down circuit, and is used to output the first voltage value.

In an embodiment of the present disclosure, the second pull-up and pull-down circuit includes a second pull-up resistor and a second pull-down resistor, the second pull-up resistor is connected to the second pull-down resistor, a connection node of the second pull-up resistor and the second pull-down resistor is used as the output end of the second pull-up and pull-down circuit, and is used to output the second voltage value.

The present disclosure also provides a vehicle entry system. The vehicle entry system includes: at least two anchor point assemblies, provided at different locations of a vehicle, wherein each anchor point assembly stores a total firmware package; and at least two vehicle end modules, wherein each vehicle end module is connected to a corresponding anchor point assembly, and each vehicle end module generates a position identification signal; where each anchor point assembly selects a firmware package corresponding to the position identification signal from the total firmware package based on a corresponding position identification signal, and executes the firmware package to implement a corresponding vehicle use function.

In an embodiment, each vehicle-end module includes a first pull-up and pull-down circuit, connected to a first anchor point assembly of the at least two anchor point assemblies, for generating a first identification signal; and a second pull-up and pull-down circuit, connected to the first anchor point assembly, for generating a second identification signal; where the first anchor point assembly selects the firmware package from the total firmware package based on the first identification signal and the second identification signal, and executes the firmware package, to implement the corresponding vehicle use function, wherein the firmware package corresponds to the first identification signal and the second identification signal.

In an embodiment, the first pull-up and pull-down circuit comprises a first pull-up resistor and a first pull-down resistor, wherein the first pull-up resistor and the first pull-down resistor are connected in series, and a first node between the first pull-down resistor and the first pull-down resistor is connected to the first anchor point assembly; the second pull-up and pull-down circuit comprises a second pull-up resistor and a second pull-down resistor, wherein the second pull-up resistor and the second pull-down resistor are connected in series, and a second node between the second pull-up resistor and the second pull-down resistor is connected to the first anchor point assembly; by setting a connection relationship between a first end of the first pull-up and pull-down circuit and a power supply and a connection between a second end of the first pull-up and pull-down circuit and ground, the first identification signal indicating a high level or a low level is generated on the first node; by setting a connection relationship between a first end of the second pull-up and pull-down circuit and the power supply and a connection between a second end of the second pull-up and pull-down circuit and the ground, the second identification signal indicating a high level or a low level is generated on the second node.

In an embodiment, each anchor point assembly includes: a positioning module, for obtaining position information of a control terminal; and a control module, connected to the positioning module and a vehicle end module, for selecting the firmware package corresponding to the position identification signal from the total firmware package based on the position identification signal, and for executing a program corresponding to the position information of the control terminal in the firmware package, to implement a corresponding vehicle use function.

In an embodiment, the positioning module includes: a Bluetooth positioning unit, for obtaining first position information of the control terminal; and an ultra-wideband positioning unit, for obtaining second position information of the control terminal; where the first position information is different from the second position information, and the control module executes the program corresponding to the position information of the control terminal in the firmware package corresponding to said position information of said control terminal based on the first position information and the second position information, to achieve a corresponding vehicle use function.

In an embodiment, the control module includes: a chip peripheral circuit, connected to a corresponding vehicle terminal module, for processing and transmitting a corresponding position identification signal; and a control chip, connected to the chip peripheral circuit, for selecting the firmware package corresponding to the position identification signal from the total firmware package according to the position identification signal, and executing a program corresponding to the position information of the control terminal in the firmware package according to the position information of the control terminal to implement a corresponding vehicle use function.

As described above, the anchor point assembly in one or more embodiments of the present disclosure has the following beneficial effects:

The anchor point assembly includes the control module, the power management module and the positioning module. The control module obtains position information of the vehicle end module according to the position identification signal of the vehicle end module. This structure allows the firmware of multiple anchor point assemblies to be integrated in one firmware package, and during the actual burning process, the control module selects a corresponding program from the firmware package for execution according to the position information of the vehicle end module. On one hand, only one firmware package is developed and maintained, which reduces the workload of firmware development and maintenance; on the other hand, the same firmware package is burned into all the anchor point assemblies and there is no mismatch between the firmware packages and the anchor assemblies due to reasons like misoperations, which reduces the rework rate.

REFERENCE NUMERALS

Figure 1:
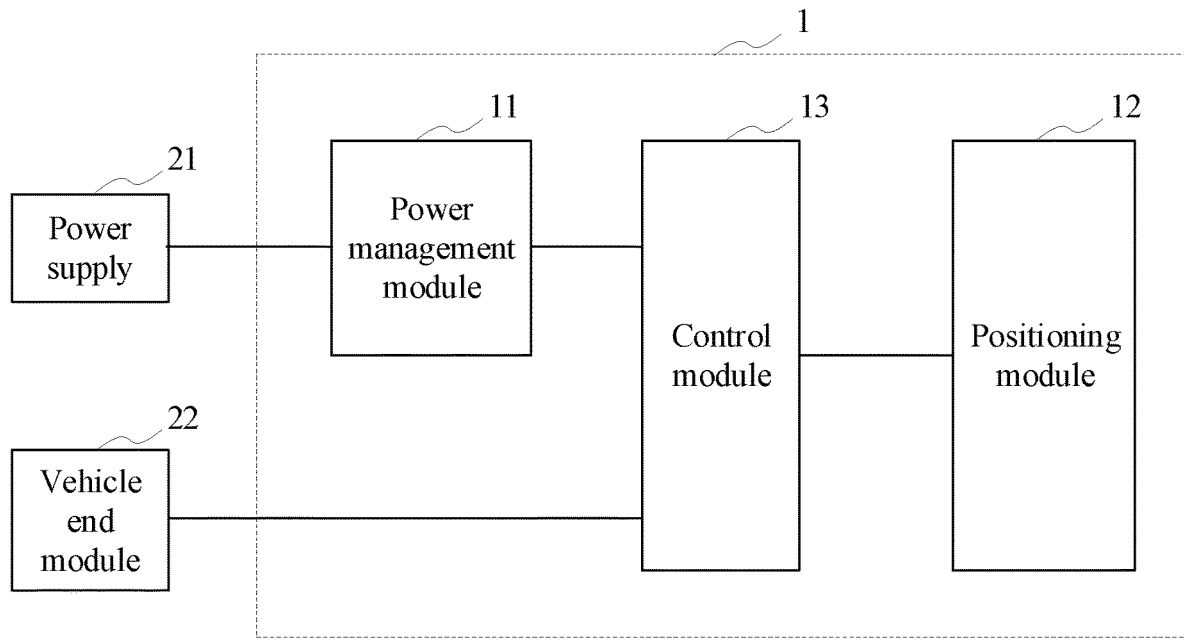
FIG. 1 is a schematic structural diagram of an anchor point assembly according to an embodiment of the present disclosure.

1 Anchor point assembly
11 Power management module
12 Positioning module
121 Bluetooth positioning unit
122 Ultra-wideband positioning unit
13 Control module
131 Control chip
132 Chip peripheral circuit
1321 Connection branch
1322 Connection branch
21 Power supply
22 Vehicle end module
221 Pull-up and pull-down circuit
222 Pull-up and pull-down circuit

DETAILED DESCRIPTION

The embodiments of the present disclosure will be described below through specific examples. One skilled in the art can easily understand other advantages and effects of the present disclosure according to contents disclosed in the description. The present disclosure may also be implemented or applied through other different embodiments, and various modifications or changes may be made to all details in the description based on different points of view without departing from the spirit of the present disclosure.

It should be noted that, the drawings provided in this embodiment only exemplify the basic idea of the present disclosure. Although only the components related to the present disclosure are shown in the drawings, they are not necessarily drawn according to the quantities, shapes, and sizes of the components during actual implementation. During actual implementation, the patterns, quantities, and proportions of the components may be changed as needed, and the layout of the components may be more complicated. In addition, terms such as "first", "second" and the like are only used to distinguish one entity or operation from another entity or operation, and do not necessarily require or imply any such actual relationship or order between these entities or operations.

In recent years, more and more vehicles are equipped with vehicle entry systems. However, there are still some problems in the existing vehicle entry systems. Taking a vehicle entry system including four anchor point assemblies as an example, the four anchor point assemblies are installed on the front left, the front right, the rear left, and the rear right of a vehicle respectively. In the prior art, each of the four anchor assemblies needs to be configured with its own corresponding firmware package and each firmware package is maintained individually, and there is a problem of mismatch between the firmware packages and the anchor point assemblies due to reasons like misoperations.

An embodiment of the present disclosure provides an anchor point assembly for a vehicle entry system to solve the above problems. FIG. 1 shows a schematic structural diagram of the anchor point assembly 1 in this embodiment. In this embodiment, as shown in FIG. 1, the anchor point assembly includes a power management module 11, a positioning module 12, and a control module 13.

The power management module 11 is connected to the control module 13, and is used to supply electric power to the control module in conjunction with a power supply 21. The power supply 21 includes, but is not limited to, a power supply installed inside a vehicle. The power management module 11 is mainly used to complete some power management work, e.g., the conversion of electric power, power distribution, detection, and the like.

The positioning module 12 is connected to the control module 13, and is used to obtain position information of a control terminal and to transmit the position information of the control terminal to the control module 13. The control module 13 performs corresponding operations (e.g., automatic unlocking or automatic locking, one-touch start, and the like) based on the position information of the control terminal. In an embodiment, the control terminal is a key to the vehicle, and/or a cell phone.

The control module 13 is also connected to the vehicle end module 22 and is used to obtain position information of the vehicle end module 22 based on a position identification signal of the vehicle end module 22. The control module 13 may be directly connected to the vehicle end module 22, or the control module 13 may be indirectly connected to the vehicle end module 22 through a connector. The vehicle end module 22 is configured to generate the position identification signal and to transmit the position identification signal to the control module 13. The position identification signal is used to identify the position of the vehicle end module 22.

According to the above description, the anchor point assembly 1 described in this embodiment includes the power management module 11, the positioning module 12, and the control module 13. The control module 13 is connected to the vehicle end module 22 and obtains the position information of the vehicle end module 22 based on the position identification signal of the vehicle end module 22. When the structure shown in FIG. 1 is adopted in multiple anchor point assemblies of a vehicle, the firmware of these anchor point assemblies is integrated in one firmware package. During the actual burning process, the control module 13 selects a corresponding program from the firmware package for execution according to the position information of the vehicle end module 22. On one hand, only one firmware package is developed and maintained, which reduces the workload of firmware development and maintenance; on the other hand, the same firmware package is burned into all the anchor point assemblies and there is no mismatch between the firmware packages and the anchor assemblies due to reasons like misoperations, which reduces the rework rate.

Figure 2:
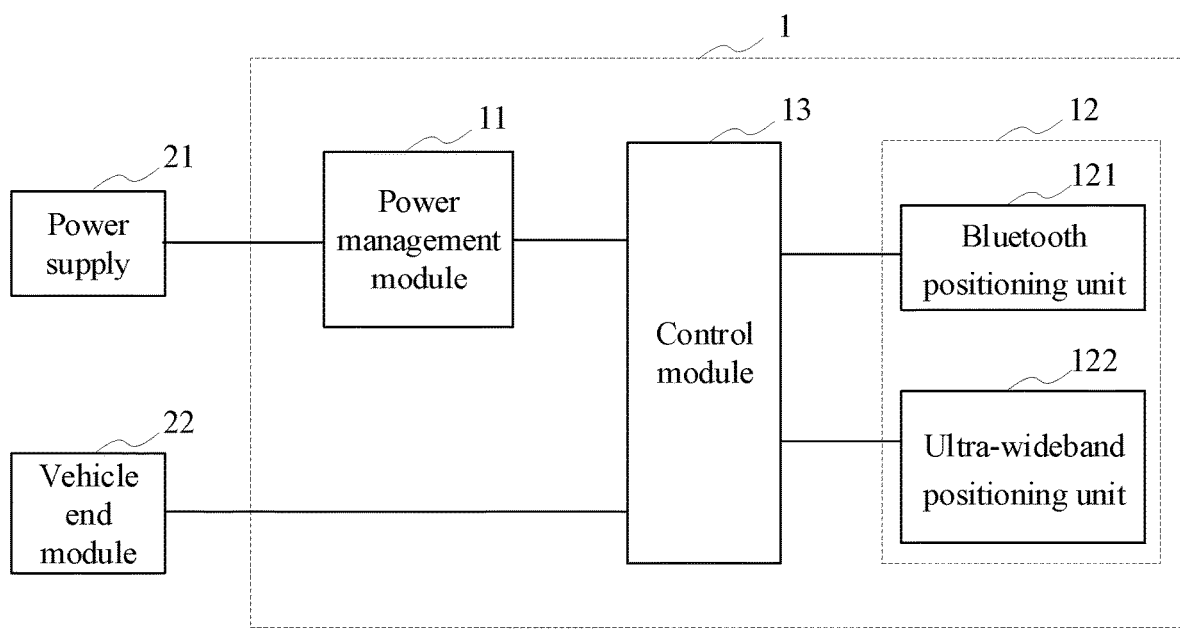
FIG. 2 is a schematic structural diagram of an anchor point assembly according to an embodiment of the present disclosure.

In an embodiment, as shown in FIG. 2, the positioning module includes a Bluetooth positioning unit 121 and an ultra-wideband positioning unit 122. The Bluetooth positioning unit 121 is connected to the control terminal through Bluetooth, and is used to obtain first position information of the control terminal. The first position information indicates a distance between the control terminal and the vehicle. The ultra-wideband positioning unit 122 is connected to the control terminal through ultra-wideband technology, and is used to obtain second position information of the control terminal. The second position information indicates the orientation of the control terminal with respect to the vehicle. In another embodiment, the positioning module 12 includes the Bluetooth positioning unit 121 or the ultra-wideband positioning unit 122. In other embodiments, the positioning module 12 includes positioning units that adopt other positioning technologies.

Figure 3A:
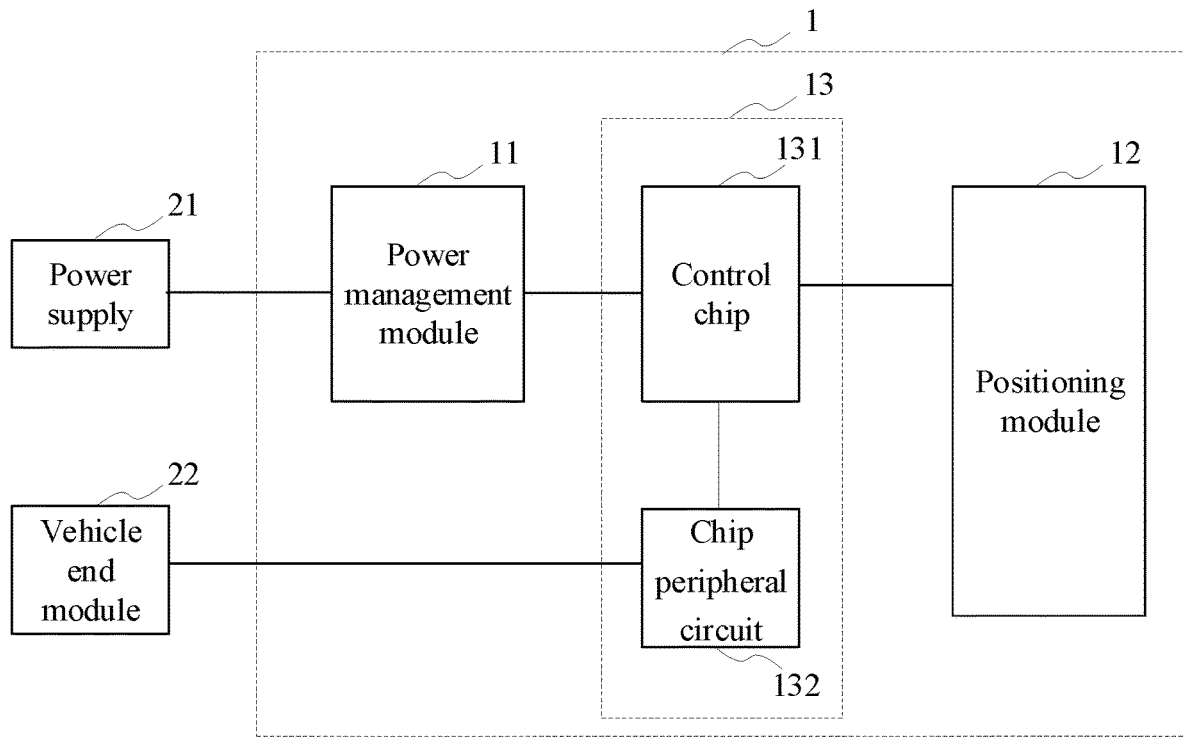
FIG. 3A is a schematic structural diagram of an anchor point assembly according to an embodiment of the present disclosure.

In an embodiment, referring to FIG. 3A, the control module includes a control chip 131 and a chip peripheral circuit 132. The chip peripheral circuit 132 is connected between the control chip 131 and the vehicle end module 22. The chip peripheral circuit 132 is used to protect the control chip 131.

Figure 3B:
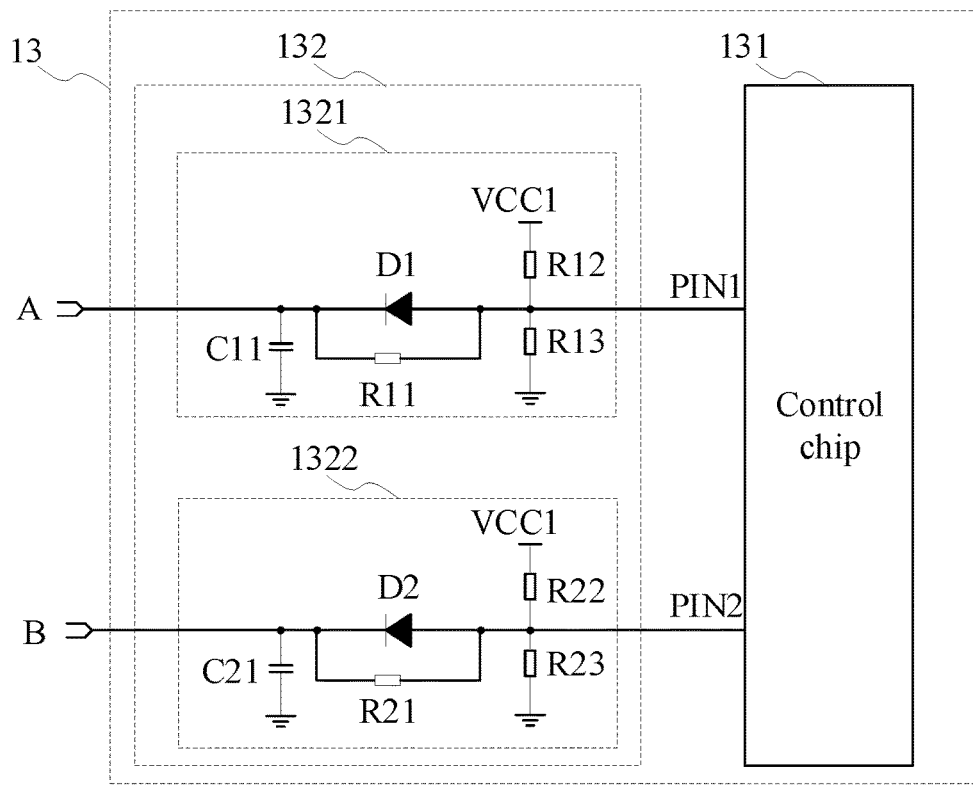
FIG. 3B is schematic structural diagram of a control module of an anchor point assembly according to an embodiment of the present disclosure.

Next, the vehicle end module 22 and the control module 13 will be described in detail by taking the vehicle entry system including four anchor point assemblies as an example. In an embodiment, referring to FIG. 3C, the vehicle end module 22 includes pull-up and pull-down circuits 221, 222. The pull-up and pull-down circuit 221 includes a pull-up resistor R31 and a pull-down resistor R32. The pull-up and pull-down circuit 222 includes a pull-up resistor R41 and a pull-down resistor R42. Referring to FIG. 3B, the chip peripheral circuit 132 includes connection branches 1321, 1322. The chip peripheral circuit 132 is connected to a high voltage VCC2, for example 12V. The connection branch 1321 is connected to the pull-up and pull-down circuit 221 and a pin PIN1 of the control chip 131. The connection branch 1322 is connected to the pull-up and pull-down circuit 222 and a pin PIN2 of the control chip 131.

In this embodiment, each of the connection branches 1321, 1322 includes a current limiting subcircuit and a filter subcircuit. Next, the connection branch 1321 will be introduced in detail as an example. It should be noted that the structure and working principle of the connection branch 1322 is the same as that of the connection branch 1321. In an embodiment, the filter subcircuit of the connection branch 1321 includes a capacitor C11, and is used to filter out signals other than the position identification signal, so that the control chip 131 may more accurately identify the position identification signal of the vehicle end module 22. The current limiting subcircuit of the connection branch 1321 includes a first resistor R11, a second resistor R12, a third resistor R13, and a diode D1, and is used to protect the control chip 131. A first end of the first resistor R11 is connected to an output end A of the pull-up and pull-down circuit 221 (i.e. terminal A connected between the pull-up resistor R31 and the pull-down resistor R32) and a cathode of the diode D1, and a second end of the first resistor R11 is connected to an anode of the diode D1 and the pin PIN1 of the control chip 131. A first end of the second resistor R12 is connected a high voltage VCC1, and a second end of the second resistor R12 is connected to the anode of the diode D1. In one embodiment, the high voltage VCC1 is 12 V, the first end of the second resistor R12 is connected to a power supply, or is connected to a pin of the control chip 131, wherein the pin has a high voltage. A first end of the third resistor R13 is connected to ground, and a second end of the third resistor R13 is connected to the anode of the diode D1.

Based on the above structure of the vehicle end module 22 and the control module 13, the four vehicle end modules may be configured with different position identification signals in practical applications. For example, the output ends of the pull-up and pull-down circuits 221 and 222 of the first vehicle end module may be configured to have a high potential, an output end of the pull-up and pull-down circuit 221 of the second vehicle end module may be configured to have a high potential and an output end of the pull-up and pull-down circuit 222 of the second vehicle end module may be configured to have a low potential, an output end of the pull-up and pull-down circuit 221 of the third vehicle end module may be configured to have a low potential and an output end of the pull-up and pull-down circuit 222 may be configured to have a high potential, and the output ends of the pull-up and pull-down circuits 221 and 222 of the fourth vehicle end module may be configured to have a low potential. At this time, the control chip 131 determines the position information and the identity information of the vehicle end module 22 connected to the anchor point assembly 1 based on the voltage values of the pins PIN1 and PIN2.

Figure 3C:
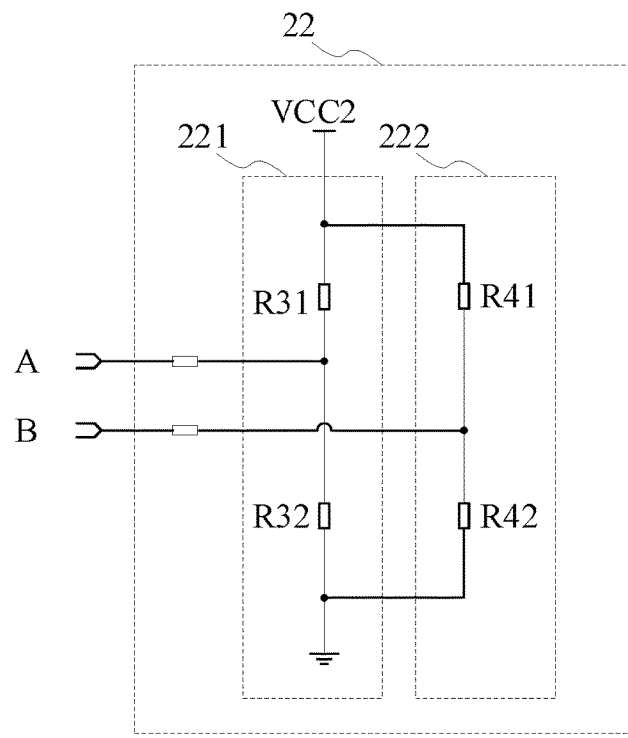
FIG. 3C is a circuit diagram of a vehicle end module according to an embodiment of the present disclosure.

It should be noted that the circuit structure of the chip peripheral circuit 132 and the vehicle end module 22 shown in FIG. 3B and FIG. 3C is only one embodiment of the present disclosure.

In an embodiment, the anchor point assembly 1 obtains a firmware package via a vehicle's CAN bus. In an embodiment, a master controller in the vehicle entry system may send the same firmware package to all anchor assemblies on the vehicle via the CAN bus, so that the firmware package is burned into all the anchor point assemblies. The same firmware package is burned into all the anchor point assemblies when the anchor point assemblies are produced.

Figure 4:
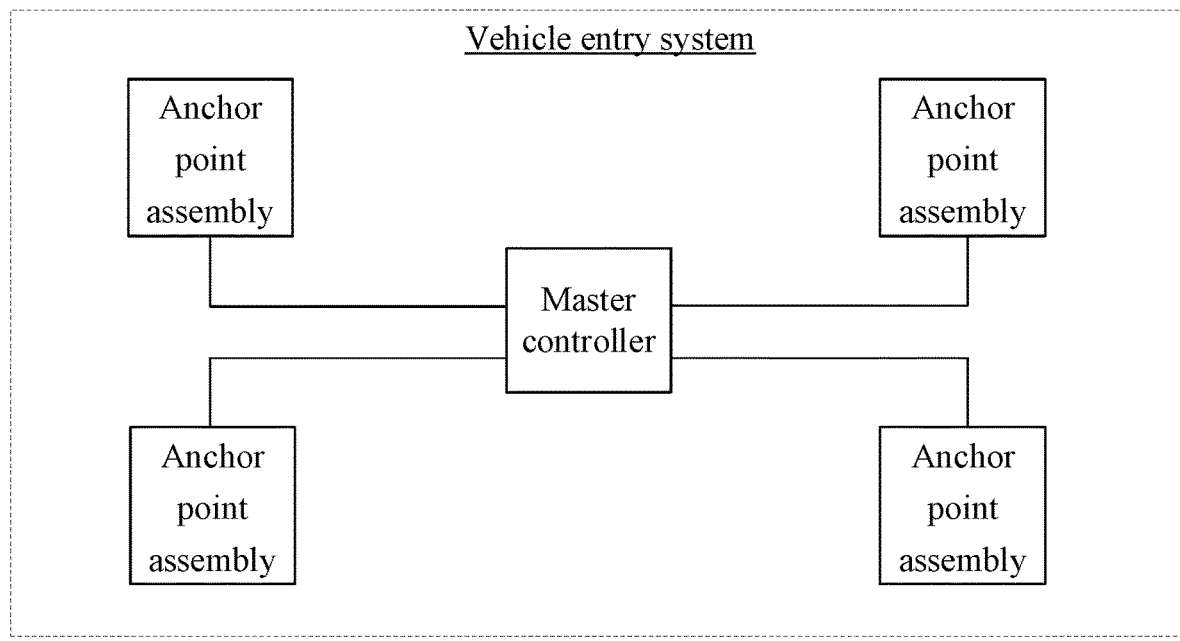
FIG. 4 is a schematic structural diagram of a vehicle entry system according to an embodiment of the present disclosure.

A vehicle entry system is provided based on the above description of the anchor point assembly 1. In an embodiment, referring to FIG. 4, the vehicle entry system includes a master controller and four anchor point assemblies, and each anchor point assembly adopts the structure shown in FIG. 1. In this embodiment, the four anchor point assemblies are disposed at different positions of the vehicle and are communicated with the master controller, and the same firmware package is burned into the four anchor point assemblies. In an embodiment, the firmware package includes the firmware of the four anchor point assemblies, and the control module of each anchor point assembly selects a corresponding program for execution based on the position identification signal of the vehicle end module connected to the control module. It should be noted that the vehicle entry system in this embodiment including four anchor point assemblies is only one embodiment of the present disclosure, and the number of anchor point assemblies may be determined according to the specific needs in practical application.

In the above description of the anchor point assembly 1, a vehicle is provided. The vehicle includes a master controller, at least two vehicle end modules, and at least two anchor point assemblies as shown in FIG. 1. The vehicle end modules are disposed at different positions of the vehicle. Each anchor point assembly is connected to a corresponding vehicle end module, and each anchor point assembly is communicated with the master controller, and a firmware package is burned into each anchor point assembly.

A vehicle entry system is also provided. The vehicle entry system includes at least two anchor point assemblies and at least two vehicle end modules.

The at least two anchor point assemblies are provided at different locations of a vehicle. For example, the vehicle has four anchor point assemblies, the locations of the four anchor point assemblies are as follows: a first anchor point assembly is set on the front left side of the vehicle, a second anchor point assembly is set on the front right side of the vehicle, a third anchor point assembly is set on the rear left side of the vehicle and a fourth anchor point assembly is set on the rear right side of the vehicle.

Each anchor point assembly stores a total firmware package. The total firmware package is a collection of firmware packages in each anchor assembly of a vehicle in the prior art. The total firmware package is burned into each anchor point assembly when the anchor point assemblies are produced.

Each vehicle end module is connected to a corresponding anchor assembly, and each vehicle end module generates a position identification signal. For example, four vehicle end modules are provided, a first vehicle end module is connected to the first anchor assembly and generates a first position identification signal, a second vehicle end module is connected to the second anchor assembly and generates a second position identification signal, a third vehicle end module is connected to the third anchor assembly and generates a third position identification signal, and a fourth vehicle end module is connected to a fourth anchor assembly and generates a fourth position identification signal.

Each anchor point assembly selects a firmware package corresponding to the position identification signal from the total firmware package based on a corresponding position identification signal, and executes the firmware package to implement a corresponding vehicle use function. For example, the total firmware package includes four firmware packages, and the first anchor point assembly selects a first firmware package corresponding to the first position identification signal from the total firmware package and executes the first firmware package based on the first position identification signal, thereby implementing the vehicle use function corresponding to the first firmware package. The functions of a second, third and fourth anchor point assemblies are similar to those of the first anchor point assembly, so these will not be described further.

In an embodiment, each anchor point assembly includes a positioning module 12 and a control module 13. The positioning module 12 is for obtaining position information of the control terminal. The control module 13 is connected to the positioning module 12 and a corresponding vehicle end module, and is for the firmware package corresponding to the position identification signal from the total firmware package based on the position identification signal, and for executing a program corresponding to the position information of the control terminal in the firmware package, to implement a corresponding vehicle use function.

In an embodiment, the positioning module includes a Bluetooth positioning unit and an ultra-wideband positioning unit. The Bluetooth positioning unit is for obtaining first position information of the control terminal. In an embodiment, the first position information is a distance between the vehicle and the control terminal, and the Bluetooth positioning unit 121 is Bluetooth. The ultra-wideband positioning unit is for obtaining second position information of the control terminal. Where the first position information is different from the second position information. In an embodiment, the second position information is an orientation of the control terminal with respect to the vehicle. The ultra-broadband positioning unit 122 may be a positioning device with ultra-broadband technology. The control terminal may be a car key and/or a cell phone. In other embodiments, other positioning devices may also be used. The control module executes the program corresponding to the position information of the control terminal in the firmware package corresponding to said position information of said control terminal based on the first position information and the second position information, to achieve a corresponding vehicle use function.

In an embodiment, the control module 13 includes a chip peripheral circuit 132 and a control chip 131. The chip peripheral circuit 132 is connected to a corresponding vehicle terminal module, and is for processing and transmitting a corresponding position identification signal. The control chip 131 is connected to the chip peripheral circuit 132, for selecting the firmware package corresponding to the position identification signal from the total firmware package according to the position identification signal, and executing a program corresponding to the position information of the control terminal in the firmware package according to the position information of the control terminal to implement a corresponding vehicle use function.

In an embodiment, each vehicle-end module includes a first pull-up and pull-down circuit 221 and a second pull-up and pull-down circuit 222. The first pull-up and pull-down circuit 221 is connected to a first anchor point assembly of the at least two anchor point assemblies and is for generating a first identification signal. In an embodiment, the first pull-up and pull-down circuit 221 includes a first pull-up resistor R31 and a first pull-down resistor. Where the first pull-up resistor R31 and the first pull-down resistor R32 are connected in series, and a first node A between the first pull-up resistor R31 and the first pull-down resistor R32 is connected to the first anchor point assembly. By setting a connection relationship between a first end of the first pull-up and pull-down circuit 221 and a power supply VCC2, and a connection relationship between a second end of the first pull-up and pull-down circuit 221 and ground, the first identification signal indicating a high level or a low level is generated on the first node A. For example, the first end of the first pull-up and pull-down circuit 221 is set to be connected to the power supply VCC2 and the second end of the first pull-up and pull-down circuit 221 is set to be ungrounded, the first identification signal indicates a high level. The first end of the first pull-up and pull-down circuit 221 is set to be not connected to the power supply VCC2 and the second end of the first pull-up and pull-down circuit 221 is set to be grounded, the first identification signal indicates a low level.

A second pull-up and pull-down circuit is connected to the first anchor point assembly, and is for generating a second identification signal. In an embodiment, the second pull-up and pull-down circuit includes a second pull-up resistor R41 and a second pull-down resistor R42. Where the second pull-up resistor R41 and the second pull-down resistor R42 are connected in series, and a second node B between the second pull-up resistor R41 and the second pull-down resistor R42 is connected to the first anchor point assembly. By setting a connection relationship between a first end of the second pull-up and pull-down circuit 222 and the power supply VCC2, and a connection between a second end of the second pull-up and pull-down circuit 222 and the ground, the second identification signal indicating a high level or a low level is generated on the second node B. For example, the first end of the second pull-up and pull-down circuit 222 is set to be connected to the power supply VCC2 and the second end of the second pull-up and pull-down circuit 221 is set to be ungrounded, the second identification signal indicates a high level. The first end of the second pull-up and pull-down circuit 222 is set to be not connected to the power supply VCC2 and the second end of the second pull-up and pull-down circuit 222 is set to be grounded, the second identification signal indicates a low level.

The first anchor point assembly selects the firmware package from the total firmware package based on the first identification signal and the second identification signal, and executes the firmware package, to implement the corresponding vehicle use function, wherein the firmware package corresponds to the first identification signal and the second identification signal.

In an embodiment, the first end of the first pull-up and pull-down circuit of the first vehicle end module is set to be connected to the power supply VCC2 and the second end of the first pull-up and pull-down circuit of the first vehicle end module is not grounded, and the first end of the second pull-up and pull-down circuit of the first vehicle end module is set to be connected to the power supply VCC2 and the second end of the second pull-up and pull-down circuit of the first vehicle end module is not grounded. The first end of the first pull-up and pull-down circuit of the second vehicle end module is connected to the power supply VCC2 and the second end of the first pull-up and pull-down circuit of the second vehicle end module is not grounded; and the first end of the second pull-up and pull-down circuit is not connected to the power supply, and the second end is grounded. The first end of the first pull-up and pull-down circuit of the third vehicle end module is set to be not connected to the power supply VCC2 and the second end of the first pull-up and pull-down circuit of the third vehicle end module is grounded; and the first end of the second pull-up and pull-down circuit of the third vehicle end module is set to be connected to the power supply VCC2 and the second end of the second pull-up and pull-down circuit of the third vehicle end module is not grounded. The first end of the first pull-up and pull-down circuit of the fourth vehicle end module is set to be not connected to the power supply VCC2 and the second end of the first pull-up and pull-down circuit of the fourth vehicle end module is grounded; and the first end of the second pull-up and pull-down circuit of the fourth vehicle end module is set to be not connected to the power supply VCC2 and the second end of the second pull-up and pull-down circuit of the fourth vehicle end module is grounded. The first identification signal and the second identification signal generated by each vehicle end module are shown in Table 1. As can be seen, by setting an additional vehicle end module for each anchor assembly, the location of each anchor assembly can be identified based on the corresponding identification signal, and thus the corresponding firmware package can be selected from the total firmware package. On the one hand, there is no need to distinguish the anchor point assemblies, and it is also convenient for subsequent installation; on the other hand, it effectively avoids the problem of incorrectly performing functions due to anchor point assemblies not being installed in the correct location.

TABLE 1

|  | the first identification signal | the second identification signal |
| --- | --- | --- |
| The first vehicle end module | High level | High level |
| The second vehicle end module | High level | Low level |
| The third vehicle end module | Low level | High level |
| The fourth vehicle end module | Low level | Low level |

As described above, the anchor point assembly described in one or more embodiments of the present disclosure includes the control module, the power management module, and the positioning module. The control module is connected to the vehicle end module and obtains the position information of the vehicle end module according to the position identification signal of the vehicle end module. Based on the structure of the anchor point assemblies, the firmware of multiple anchor point assemblies is integrated in one firmware package. During the actual burning process, the control module selects a corresponding program from the firmware package for execution based on the position information of the vehicle end module. On one hand, only one firmware package is developed and maintained, which reduces the workload of firmware development and maintenance and the number of firmware packages are reduced, which effectively reduces management costs and improves management efficiency. On the other hand, the same firmware package is burned into all the anchor point assemblies and there is no mismatch between the firmware package and the anchor assembly due to reasons like misoperations, which reduces the rework rate. In the present disclosure, after the firmware package is burned into the anchor point assemblies, the anchor point assemblies are directly installed at different positions of the vehicle and there is no need to distinguish the corresponding relationship between the anchor point assemblies and different positions of the vehicle. In summary, the present disclosure effectively overcomes various shortcomings in the prior art and has a high industrial value.

The above-mentioned embodiments are merely illustrative of the principle and effects of the present disclosure instead of limiting the present disclosure. Modifications or variations of the above-described embodiments may be made by those skilled in the art without departing from the spirit and scope of the present disclosure. Therefore, all equivalent modifications or changes made by those who have common knowledge in the art without departing from the spirit and technical concept disclosed by the present disclosure shall be still covered by the claims of the present disclosure.

What is claimed is:

1. An anchor point assembly for a vehicle entry system, comprising:
    a control module comprising a control chip and a chip peripheral circuit, connected to a vehicle end module, used to obtain position information of the vehicle end module according to a position identification signal of the vehicle end module, wherein the chip peripheral circuit comprises at least one connection branch, each of which comprises a current limiting subcircuit and/or a filter subcircuit;
    a power management module, connected to the control module, used to supply electric power to the control module in conjunction with a power supply of a vehicle; and
    a positioning module, connected to the control module, used to obtain position information of a control terminal and transmit the position information of the control terminal to the control module;
    wherein the current limiting subcircuit comprises a first resistor, a second resistor, a third resistor, and a diode,
    wherein a first end of the first resistor is connected to an output end of a corresponding pull-up and pull-down circuit and a cathode of the diode, and a second end of the first resistor is connected to an anode of the diode and a corresponding pin of the control chip;
    wherein the second resistor is connected between a high voltage and the anode of the diode;
    wherein the third resistor is connected between the anode of the diode and ground.

2. The anchor point assembly according to claim 1, wherein the positioning module comprises:
    a Bluetooth positioning unit, used to obtain first position information of the control terminal; and
    an ultra-wideband positioning unit, used to obtain second position information of the control terminal.

3. The anchor point assembly according to claim 1, wherein the chip peripheral circuit is connected between the control chip and the vehicle end module.

4. The anchor point assembly according to claim 3, wherein the vehicle end module comprises at least one pull-up and pull-down circuit, and each connection branch is connected to a corresponding pull-up and pull-down circuit and a pin of the control chip respectively.

5. The anchor point assembly according to claim 1, wherein the filter subcircuit comprises at least one filter capacitor.

6. The anchor point assembly according to claim 1, wherein the anchor point assembly obtains a firmware package via the vehicle's CAN bus.

7. A vehicle entry system, comprising:
   at least two anchor point assemblies, provided at different locations of a vehicle, wherein each anchor point assembly stores a total firmware package; and
   at least two vehicle end modules, wherein each vehicle end module is connected to a corresponding anchor point assembly, each vehicle-end module comprises a first pull-up and pull-down circuit and a second pull-up and pull-down circuit, and each vehicle end module generates a position identification signal;
   wherein each anchor point assembly selects a firmware package corresponding to the position identification signal from the total firmware package based on a corresponding position identification signal, and executes the firmware package to implement a corresponding vehicle use function;
   wherein the first pull-up and pull-down circuit comprises a first pull-up resistor and a first pull-down resistor, wherein the first pull-up resistor and the first pull-down resistor are connected in series, and a first node between the first pull-down resistor and the first pull-down resistor is connected to the first anchor point assembly;
   wherein the second pull-up and pull-down circuit comprises a second pull-up resistor and a second pull-down resistor, wherein the second pull-up resistor and the second pull-down resistor are connected in series, and a second node between the second pull-up resistor and the second pull-down resistor is connected to the first anchor point assembly;
   wherein by setting a connection relationship between a first end of the first pull-up and pull-down circuit and a power supply, and a connection between a second end of the first pull-up and pull-down circuit and ground, the first identification signal indicating a high level or a low level is generated on the first node; by setting a connection relationship between a first end of the second pull-up and pull-down circuit and the power supply, and a connection between a second end of the second pull-up and pull-down circuit and the ground, the second identification signal indicating a high level or a low level is generated on the second node.

8. The vehicle entry system according to claim 7, wherein each vehicle-end module comprises:
   a first pull-up and pull-down circuit, connected to a first anchor point assembly of the at least two anchor point assemblies, for generating a first identification signal; and
   a second pull-up and pull-down circuit, connected to the first anchor point assembly, for generating a second identification signal;
   wherein the first anchor point assembly selects the firmware package from the total firmware package based on the first identification signal and the second identification signal, and executes the firmware package, to implement the corresponding vehicle use function, wherein the firmware package corresponds to the first identification signal and the second identification signal.

9. The vehicle entry system according to claim 7, wherein each anchor point assembly comprises:
   a positioning module, for obtaining position information of a control terminal; and
   a control module, connected to the positioning module and a corresponding vehicle end module, for selecting the firmware package corresponding to the position identification signal from the total firmware package based on the position identification signal, and for executing a program corresponding to the position information of the control terminal in the firmware package, to implement a corresponding vehicle use function.

10. The vehicle entry system according to claim 9, wherein the positioning module comprises:
    a Bluetooth positioning unit, for obtaining first position information of the control terminal; and
    an ultra-wideband positioning unit, for obtaining second position information of the control terminal;
    wherein the first position information is different from the second position information, and the control module executes the program corresponding to the position information of the control terminal in the firmware package corresponding to said position information of said control terminal based on the first position information and the second position information, to achieve a corresponding vehicle use function.

11. The vehicle entry system according to claim 9, wherein the control module comprises: a chip peripheral circuit, connected to a corresponding vehicle terminal module, for processing and transmitting a corresponding position identification signal; and
    a control chip, connected to the chip peripheral circuit, for selecting the firmware package corresponding to the position identification signal from the total firmware package according to the position identification signal, and executing a program corresponding to the position information of the control terminal in the firmware package according to the position information of the control terminal to implement a corresponding vehicle use function.

* * * * *